United States Patent Office.

ORAZIO LUGO, OF BALTIMORE, MARYLAND.

Letters Patent No. 97,939, dated December 14, 1869

IMPROVED FERTILIZER OR GUANO.

The Schedule referred to in these Letters Patent and making part of the same.

*To all whom it may concern:*

Be it known that I, ORAZIO LUGO, of the city and county of Baltimore, and State of Maryland, have invented certain new and useful Improvements in Fertilizers or Guanos; and do hereby declare the following to be a full and correct description thereof.

The nature of my invention consists in manufacturing an antiseptic fertilizer from fish, or other animal matter, by means of hot-air or gas vapors, or solutions of benzole benzines, light kerosene, and petroleum, and phenol, (carbolic acid,) or its equivalent, each added successively, in the manner hereafter more fully specified.

In order to enable those skilled in the science and art to apply my invention, I will proceed to describe the process.

The fish, or other animal matters, are first cut into small pieces, then put on shelves in a vessel that can be made air-tight, except having an inlet and an outlet.

Connected with the inlet, at the top of the vessel, is an air-pump or blower, by means of which hot air (I prefer that the temperature should be between 170° to 190° Fahrenheit) is introduced and forced to pass downward through the fish or animal matters, until about ninety per cent. of the water contained in said animal matter or fish is extracted by the hot air.

This water that is carried off by the hot air is condensed in a condenser connected with the outlet of the vessel above mentioned.

When the operation has arrived at this point, the blast of hot air is cut off from the vessel, and a current of hydrocarbon and phenol (carbolic acid) vapors is introduced into the vessel, and is forced to pass down through the animal matter or fish by means of a current of air.

The hydrocarbon and surplus phenol, having in solution the oils and fatty matters, are condensed in a condenser attached to the outlet at the bottom of the vessel and collected.

The quantity of hydrocarbon and phenol to be added or used is regulated by the amount of animal matter or fish being operated upon.

When the hydrocarbon and phenol-vapors pass through the vessel unaffected, the supply is cut off, and the blast of hot air is again introduced into the vessel, in order to expel the remaining portion of water and hydrocarbon.

The dry animal matter or fish is then taken out of the vessel, and ground, or otherwise pulverized, and the antiseptic fertilizer is ready for use.

The well-known antiseptic qualities of phenol (carbolic acid) remaining, in a degree, in the fertilizer, prevents further decomposition, which can only take place at the expense of some of the valuable qualities of the fertilizer, if allowed to proceed.

The effect of the carbolic acid is also of great benefit in destroying obnoxious insects and animalculæ in the earth to which the fertilizer is applied.

Having thus described the process of preparing my fertilizer or guano,

What I claim as my invention, and desire to secure by Letters Patent of the United States, is—

1. The use of hot air, for the purpose and in the manner substantially as herein set forth.

2. The use of the hydrocarbons, or their equivalents, in the connection herein described, and for the purpose set forth.

3. The use of phenol, (carbolic acid,) or its equivalent, for the purpose herein specified, and in the manner substantially as herein described.

4. As a new article of manufacture, the antiseptic fertilizer, the process for the manufacture of which is herein set forth.

ORAZIO LUGO.

Witnesses:
F. M. SHIPLEY,
G. S. ERGOOD.